(12) United States Patent  
Bagaini et al.

(10) Patent No.: US 9,417,346 B2  
(45) Date of Patent: Aug. 16, 2016

(54) SEISMIC VIBRATOR DEVICE AND METHOD WITH ROTATION SENSOR

(71) Applicant: WESTERNGECO L.L.C., Houston, TX (US)

(72) Inventors: Claudio Bagaini, Cottenham (GB); Julian Edward Kragh, Great Bardfield (GB)

(73) Assignee: WESTERNGECO L.L.C., Houston, TX (US)

(*) Notice: Subject to any disclaimer, the term of this patent is extended or adjusted under 35 U.S.C. 154(b) by 0 days.

(21) Appl. No.: 14/470,445

(22) Filed: Aug. 27, 2014

(65) Prior Publication Data

US 2015/0063065 A1   Mar. 5, 2015

Related U.S. Application Data

(60) Provisional application No. 61/871,743, filed on Aug. 29, 2013.

(51) Int. Cl.
*G01V 1/047* (2006.01)
*G01V 1/135* (2006.01)

(52) U.S. Cl.
CPC .............. *G01V 1/135* (2013.01); *G01V 1/0475* (2013.01); *Y10T 29/49002* (2015.01); *Y10T 29/49229* (2015.01)

(58) Field of Classification Search
CPC .............. G01V 1/47; G01V 1/53; G01V 1/02
USPC .................................................. 181/121, 113
See application file for complete search history.

(56) References Cited

U.S. PATENT DOCUMENTS

| 4,327,814 A * | 5/1982 | Erich, Jr. .................... 181/121 |
| 4,959,818 A | 9/1990 | Cole |
| 5,554,829 A * | 9/1996 | Jaworski .................... 181/114 |
| 6,868,356 B2 | 3/2005 | Nai et al. |
| 7,656,746 B2 | 2/2010 | de Kok et al. |
| 7,933,163 B2 | 4/2011 | Fossum et al. |
| 2005/0224279 A1 * | 10/2005 | Gilmer et al. ............... 181/121 |
| 2006/0245300 A1 | 11/2006 | De Kok et al. |
| 2008/0008033 A1 | 1/2008 | Fossum et al. |
| 2009/0073807 A1 | 3/2009 | Sitton et al. |
| 2010/0195439 A1 | 8/2010 | Muyzert |
| 2010/0202251 A1 * | 8/2010 | Ozdemir et al. ............. 367/24 |
| 2013/0088939 A1 * | 4/2013 | Edme et al. ................. 367/43 |
| 2013/0343158 A1 * | 12/2013 | Kragh et al. ................ 367/34 |
| 2015/0316667 A1 * | 11/2015 | Projetti et al. .............. 367/15 |

FOREIGN PATENT DOCUMENTS

EP   256627 A2   2/1988
WO   2014099786   6/2014

OTHER PUBLICATIONS

Lee et al., "Introduction to the Special Issue on Rotational Seismology and Engineering Applications," Bulletin of the Seismological Society of America, May 2009, vol. 99(2B): pp. 945-957.
International Search Report and Written Opinion for corresponding International App No. PCT/US2014/053125, Dec. 11, 2014, 9 pages.

* cited by examiner

*Primary Examiner* — Forrest M Phillips
(74) *Attorney, Agent, or Firm* — Kevin B. McGoff

(57) ABSTRACT

A seismic land vibrator, comprising a baseplate comprising a substantially flat, rigid member; at least one driven member that is connected with the baseplate and extends in a direction that is substantially perpendicular to baseplate; a rotation sensor that is coupled to the baseplate and adapted to provide a signal that is indicative of rotational movement of at least a portion of the baseplate.

27 Claims, 1 Drawing Sheet

SEISMIC VIBRATOR DEVICE AND METHOD WITH ROTATION SENSOR

CROSS-REFERENCE TO RELATED APPLICATION

This application claims the benefit of U.S. Provisional Patent Application Ser. No. 61/871,743 filed Aug. 29, 2013, which is incorporated herein by reference in its entirety.

BACKGROUND

The present application is related generally to the field of land seismic vibrators used as seismic energy sources. More specifically, the present application is related to vibrators having capability to measure gradients and/or rotational data for portions of the vibrator such as the baseplate.

In seismic applications, land source vibrators can be used to generate signal output, which when reflected off subsurface formations may be detected by associated seismic receivers. These detected signals can be used to obtain an image of, or information relating to, subsurface formations, which can in turn be used to assess the likelihood of hydrocarbon or other mineral deposits.

Vibrators for land can have a base plate that is connected with a driving piston device, or some other mechanism, that applies cyclic or vibrational force to the base plate, thereby inputting such signals into the ground.

It can be beneficial to know the ground force applied in a seismic survey. To model the ground force, acceleration and movement of the vibrator, including the baseplate, can be measured, detected and modeled.

There is a need for improved measurement of the piston device and the baseplate.

BRIEF SUMMARY

The present disclosure generally relates to combinations of embodied features relating to seismic land vibrators, methods of use and manufacture of such. Below are some combinations of embodied features that are presented to help the understanding of one skilled in the art, but are in no way meant to unduly limit or otherwise affect the scope of any present or future claims relating to this application.

According to a combination of embodied features, a seismic land vibrator has a baseplate with a substantially flat, rigid member; at least one driven member is connected with the baseplate and extends in a direction that is substantially perpendicular to baseplate; one or more rotation sensors are coupled to the baseplate and adapted to provide a signal that is indicative of rotational movement of at least a portion of the baseplate.

According to a combination of embodied features, a method of seismic surveying includes actuating a drive mechanism that applies force to a baseplate that impacts the ground, thereby creating a vibration signal that travels into the ground; and while the drive mechanism is actuating, making rotational measurements of the movement of the baseplate by way of rotation sensors that are coupled to the baseplate.

According to a combination of embodied features, a method of seismic surveying includes actuating a drive mechanism that applies force to a baseplate that impacts the ground, thereby creating a vibration signal that travels into the ground; and while the drive mechanism is actuating, making rotational measurements of the movement of the baseplate by way of rotation sensor that is coupled to the baseplate.

According to a combination of embodied features, a method of manufacturing a land seismic vibrator includes connecting a baseplate to a drive mechanism; connecting the baseplate to a stilt device that supports the baseplate at least partially by way of a flexible member connected between the stilt device and the baseplate; connecting the stilt device to a vehicle that can drive from place to plate, and having a raising and lowering device to raise and lower the stilt member; and connecting at least one rotation sensor to the baseplate for measurement of rotational movement of the baseplate.

BRIEF DESCRIPTION OF THE DRAWINGS

Reference is now made to the following descriptions taken in conjunction with the accompanying drawings. These drawings are meant to help the understanding of one skilled in the art, and are not in any way meant to unduly limit the scope of any present or future claims related to this application.

DETAILED DESCRIPTION

Figure 1:
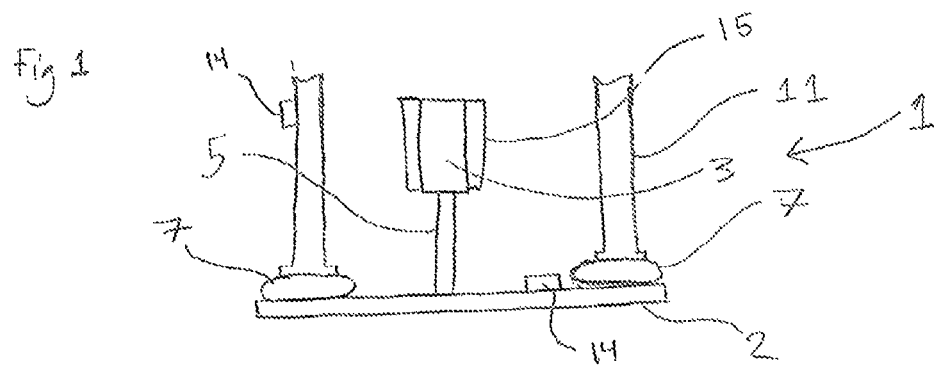
FIG. 1 is a side view of various embodied features.

Various combinations of embodied features are described herein. It is to be understood, however, that the following descriptions are merely to help the understanding of one skilled in the art, and are not meant in any way to unduly limit the scope of any present or future claims related to this application. Accordingly, modifications, changes and substitutions are contemplated with respect to the descriptions herein, while keeping within inventive scope of this application.

Various embodiments in the present application relate to seismic land vibrators. Land vibrators can be hydraulic seismic vibrators that can have hydro-mechanical systems that are driven by a servo-valve, which can be electronically controlled.

Land vibrators input vibratory signals into the ground. These signals reflect and reverberate in the earth and such reflections and reverberations can be detected by seismic sensors. Data generated therefrom can be used to derive information relating to the earth formation and/or images of such, which can be used to help determine features of the formation including presence of various minerals such as hydrocarbons, water and metals.

In a seismic survey it can be beneficial to have knowledge of the signal production and actuation of the vibrator, both for control purposes and for modeling of the signal. A variable that can be used to control and model the vibrator and the survey is the ground-force transmitted to the earth. A direct measurement of the ground-force can involve real time monitoring of the pressure beneath a baseplate of the vibrator. The baseplate can be the portion of the vibrator that is flat and impacts the earth to create the vibrations. Transducers, such as force tiles, can be used to make this measurement, but their use in large scale commercial applications can be problematic functionally and economically.

The generated ground-force can also be estimated using accelerometers. An accelerometer can be mounted on the top of a reaction mass and can be mounted on the baseplate, or the baseplate stilt structure, or the piston. However, it has been experimentally demonstrated that the motion of the driven structure, including the baseplate and the baseplate stilt structure, is not entirely uniform and therefore its acceleration can vary from one location to another. Moreover, the baseplate can be difficult to approximate as a rigid body, particularly at high frequencies. This creates issues when a small number of sensors are used at a limited number of locations.

Use of more accelerometers can be helpful to more accurately characterize the baseplate motion but a limited space is available at the baseplate itself, and the most adequate coverage may not be possible. This limited space can be due to the piston being rigidly connected to the baseplate, and the hold-down weight being applied to the baseplate by way of air-bags and other elements such as the stilts, depending on the specific vibrator. At those locations, placement of sensors can be difficult. It should be noted that air-bags can be replaced with other pliant or elastic or compressible members, such as rubber parts or other spring like members.

In order to improve measured and/or modeled aspects of the baseplate and ground force, with limited space available for sensors, the present application includes embodiments that have mounted rotation sensors at available baseplate locations that can measure, in addition to the vertical component of the acceleration, the horizontal gradient of the vertical acceleration. These additional measurements can produce an effect equivalent to (at least) a 4-times denser sampling of the baseplate motion. The determination of the horizontal gradient of the vertical acceleration (or velocity) can be obtained with rotational (angular) sensors according to the formula below $$\omega_i = \frac{1}{2}\left(\frac{\partial a_k}{\partial a_j} - \frac{\partial a_j}{\partial a_k}\right)$$

where $\omega_i$ is the rotation in the i direction, $a_i$ is the acceleration in the i direction. The subscripts i, j, and k are positive integers whose values are between 1 and 3.

Additional rotational sensors mounted on the stilt structure can enable monitoring of torsional modes that may occur while the vibrator is shaking Rocking of the baseplate and stilt structure, which can be a cause of sub-harmonics, can also be monitored and characterized using rotational sensors. Also, linear sensors can be used to determine the rotation (vertical gradient) by comparison between vertical motion of sensors spaced apart laterally from one another. The rotation sensor(s) can be mounted on the top of a reaction mass and can be mounted on the baseplate, or the baseplate stilt structure. The rotation sensor(s) can also be embedded in the baseplate, partially, or entirely where the baseplate fully surrounds the accelerometer(s).

With respect to the rotation sensors, it should be appreciated that a number of different designs can be used. Coupled single-axis or multi-axis particle motion sensors can be used. U.S. Pat. No. 6,868,356 discloses using linear particle motion sensors to detect rotational motion in machines, and is incorporated herein by reference in its entirety. MEMS rotation sensors that measure rotational (angular) movement can be used. A rotational sensor using MEMS is disclosed in PCT/US2013/075396, which is incorporated herein by reference in its entirety. Monitoring of the baseplate motion can include using closely spaced linear particle motions sensors mounted on (or embedded in) the baseplate. Rotation can be determined by way of the difference between signals of the sensors. The use of an integrated sensor package containing multicomponent accelerometers and rotational sensors can enable the characterization of rotation (horizontal gradient) of the baseplate motion using the limited area available. The characterization of the rocking motion of the baseplate stilt structure, which is also enabled by the use of rotational sensors, can permit the determination of sub-harmonics that occasionally contaminate vibroseis data.

Figure 4:
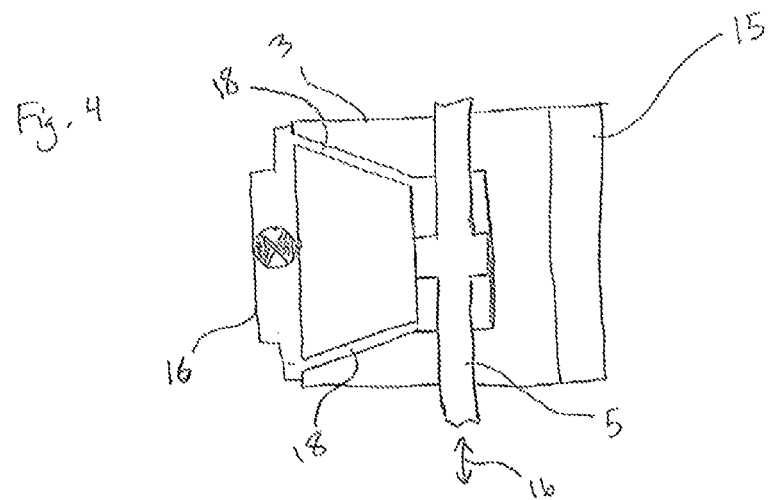
FIG. 4 is a side view of various embodiments including a hydraulic piston drive.

FIG. 1 shows a side view schematic of various embodied features including a vibrator device 1 that has a hydraulic drive device 3, a baseplate 2, and a piston 5 that is connected to the baseplate 2 and the hydraulic drive device 3. The hydraulic drive device includes a reaction mass 15 that provides reactionary force to, and is connected with, the piston 5. Stilts 11 are connected to the baseplate 2. The stilts 11 can be pistons that are connected to a vehicle, and extend to push the baseplate 2 into contact with the ground and apply hold down pressure to the vibrator device 1. It should be recognized that the stilts 11 serve to apply a hold down force for the vibrator device 1, and therefore can be a frame or other rigid structure. An air bag 7 or other pliant or flexible or elastic member can be used between the stilts 11 and the baseplate 2, so that when hold down force is applied to the baseplate 2, by way of the stilts 11, vibration movement of the baseplate 2 relative to the stilts 11 can be created by the piston 2. The piston 5 can be hydraulically driven by a hydraulic drive 3 and its reaction mass 15, and the hydraulic drive device can include a servo valve drive (as shown in FIG. 4). The reaction mass 15 can be coupled to the piston as shown in FIG. 4 (but can be in other locations and configurations) and provides a counter mass/force to the actuation of the piston 5. The piston 5 can be driven by an electromagnetic drive (EM) instead of a hydraulic drive.

Figure 2:
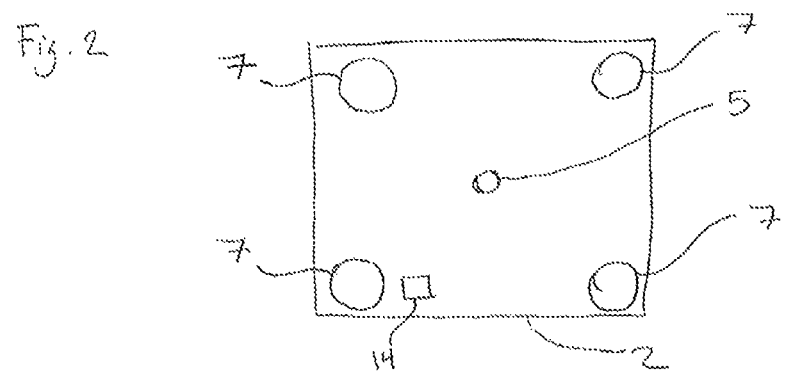
FIG. 2 is a top view of various embodied features.

FIG. 2 is a top view of the baseplate 2, showing the contact locations for the air bags 7 (or other pliant and/or elastic members), that connect between the stilts 11 and the baseplate 2. The airbags 7 allow for relative motion between the baseplate 2 and the stilts 11, when the stilts 11 are in the extended position applying hold down force. The piston 5 is actuated to provide vibrations to the baseplate 2. It should be noted that the piston 5 can directly connect with the baseplate 2, or can have intermediary members.

Figure 3:
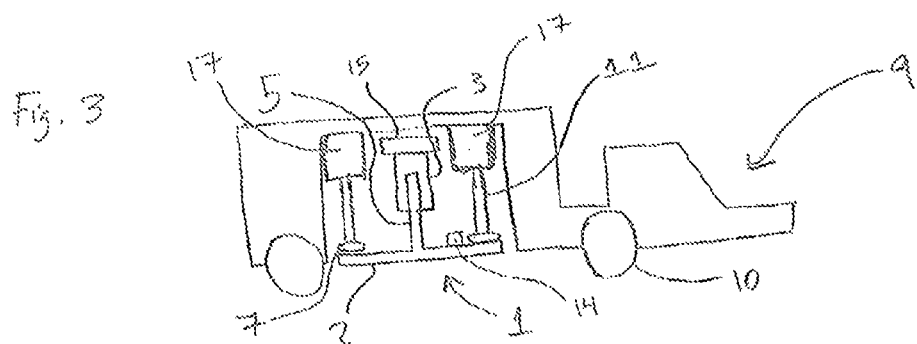
FIG. 3 is a side view of various embodied features.

FIG. 3 is a side view illustrating the vibrator device 1 being connected (mounted) to a vibrator vehicle 9. The vehicle 9 can be a truck and can have wheels 10, and/or have tracks. The vehicle 9 can drive from place to place. The reaction mass 15 is located on top of the hydraulic drive 3 in this embodiment. The stilts 11 are retractable into the housings 17.

FIG. 4 is a side view schematic of the hydraulic drive device. A reaction mass 15 is connected to the side of the hydraulic drive 3. A servo valve device 16 is connected as part of the hydraulic drive 3, so that the piston 5 is driven in alternating opposite directions as shown by the arrow 16. The force applied to the piston 3 to move the piston 3 acts against the reaction mass 15, this providing force against the baseplate 2 via the piston 3. Pathways 18 apply hydraulic pressure to alternate up/down movement of piston 3.

In operation, the vehicle 9 drives to a desired location, and the vibrator unit 1 is lowered to the ground 12 by way of the stilts 11, so that the baseplate 2 is lowered to the ground 12 and pressure is applied to the baseplate 2 against the ground 12. In this case, weight of the vehicle 9 can be borne by way of the stilts 11, to apply pressure to the vibrator unit 1 and the baseplate 2 against the ground, via the air bags 7. Instead of stilts 11, any rigid frame structure can be used and/or connected with a lowering mechanism that applies the hold-down weight that prevents the baseplate from decoupling from the ground during operations. Vibrational forces can then be applied to the piston 5 and to the baseplate 2, so that the baseplate 2 stays in contact with the ground 12, and vibrational forces (signals) are transmitted into the ground 12. Upon completion, the vibrator unit 1 and the baseplate 2 are lifted from the ground 12 by way of the stilts 11, and the vehicle 9 can drive to the next desired location, where this vibration operation can be repeated.

As part of this actuation method, rotation information for portions of the baseplate 2 and other parts of the vibrator unit 1 are detected and recorded. A rotation sensor 14 located proximate to an edge of the baseplate 2 can provide rotation information so that the contact force against the ground by the baseplate 2 near the center of the baseplate 2 can be better modeled. This information can be passed to a centralized recordation location, where it can be used in connection with seismic data recorded by seismic sensors, the seismic data being from the reverberations from the vibrations input into the ground, to generate information and modeling about the underlying formation.

It will be appreciated that the principles disclosed herein are applicable to a wide range of seismic surveys including, but not limited to, those incorporating single-component receivers, multi-component receivers, and various combinations thereof. Also, single land vibrators can be used, or a fleet of multiple and/or coordinated vibrators can be used. The rotation data can be used in real time to adjust the actuation of the vibrator drive commands, or can be stored for use at a different time.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and time such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A seismic land vibrator, comprising:
    a baseplate being a substantially flat, rigid member having one side that is adapted for contact with the ground;
    at least one driven member that is connected with the baseplate and extends in a direction that is substantially perpendicular to the baseplate;
    a rotation sensor that is coupled to the baseplate and adapted to provide a signal that is indicative of rotational movement of at least a portion of the baseplate.

2. The seismic land vibrator of claim 1, wherein the rotation sensor comprises at least two single-axis particle motion sensors that are located at different locations with respect to the baseplate.

3. The seismic land vibrator of claim 1, wherein the rotation sensor comprises at least one MEMS sensor.

4. The seismic land vibrator of claim 3, wherein the MEMS sensor measures angular motion.

5. The seismic land vibrator of claim 1, wherein the rotation sensor comprises at least two multi-axis particle motion sensors that are rigidly coupled to the baseplate.

6. The seismic land vibrator of claim 5, wherein the two multi-axis particle motion sensors have at least one axis that is shared and collinear.

7. The seismic land vibrator of claim 6, wherein the rotation sensor is to calculate rotation based on a difference between particle motion detected by the two multi-axis particle motion sensors.

8. The seismic land vibrator of claim 1, wherein the seismic land vibrator comprises a frame configured to be mounted to a truck.

9. The seismic land vibrator of claim 1, wherein the rotation sensor is embedded in the baseplate.

10. The seismic land vibrator of claim 1, wherein the driven member is a moveable piston connected to a hydraulic drive unit, and the seismic land vibrator comprises a reaction mass connected with the piston.

11. The seismic land vibrator of claim 10, wherein the rotation sensor is mounted on the reaction mass.

12. The seismic land vibrator of claim 1, wherein the rotation sensor is mounted on the baseplate.

13. The seismic land vibrator of claim 8, wherein the rotation sensor is mounted to the frame.

14. A method of seismic surveying, comprising:
    actuating a drive mechanism that applies force to a baseplate that impacts the ground, thereby creating a vibration signal that travels into the ground;
    while the drive mechanism is actuating, making measurements of rotational movement of the baseplate by way of a rotation sensor that is coupled to the baseplate.

15. The method of claim 14, comprising:
    recording the rotational measurements in a memory.

16. The method of claim 14, wherein the rotation sensor is embedded in the baseplate.

17. The method of claim 14, comprising:
    recording reverberations of the vibratory signal with seismic sensors that are located away from the baseplate.

18. The method of claim 17, comprising:
    processing data developed from the reverberations and data developed from the rotational movement to determine underground features.

19. A method of modeling a land seismic vibrator, comprising:
    measuring particle motion that is indicative of rotation of a baseplate of the land seismic vibrator, and
    using the indicated rotation of the baseplate to model movement of the baseplate.

20. The method of claim 19, comprising using the modeled movement of the baseplate to model vibrational signals that are imparted into the ground.

21. The method of claim 20, comprising using the modeled movement of the baseplate and the modeled vibrational signals to process data that is indicative of the vibrational signals recorded and of the underlying formations in the ground.

22. A method of manufacturing a land seismic vibrator, comprising:

connecting a baseplate to a drive mechanism that is configured to input vibratory forces to the baseplate;
connecting the baseplate to a stilt device that supports the baseplate at least partially by way of a flexible member connected between the stilt device and the baseplate;
connecting the stilt device to a vehicle that can drive from place to place, and has a raising and lowering device to raise and lower the stilt member; and
connecting at least one rotation sensor to the baseplate for measurement of rotational movement of the baseplate.

23. The method of claim 22, wherein the rotation sensor is a MEMS sensor that measures angular movement.

24. The method of claim 22, wherein the rotation sensor comprises two single-axis particle motion sensors that are rigidly coupled to the baseplate.

25. The method of claim 22, wherein the rotation sensor comprises two multi-axis particle motion sensors that are rigidly coupled to the baseplate.

26. The method of claim 22, comprising embedding the rotation senor in the baseplate.

27. The method of claim 26, wherein the embedding comprises entirely surrounding the rotation sensor with the baseplate.

\* \* \* \* \*